(12) United States Patent
Cremiere

(10) Patent No.: US 9,884,676 B2
(45) Date of Patent: Feb. 6, 2018

(54) ACTUATING DEVICE FOR DISPLACING A PART OF THE EMPENNAGE OF A HELICOPTER

(71) Applicant: SAGEM DEFENSE SECURITE, Boulogne-Billancourt (FR)

(72) Inventor: Benoit Cremiere, Boulogne-Billancourt (FR)

(73) Assignee: SAGEM DEFENSE SECURITE, Boulonge-Billancourt (FR)

( * ) Notice: Subject to any disclaimer, the term of this patent is extended or adjusted under 35 U.S.C. 154(b) by 80 days.

(21) Appl. No.: 14/927,041

(22) Filed: Oct. 29, 2015

(65) Prior Publication Data
US 2016/0122002 A1    May 5, 2016

(51) Int. Cl.
   *B64C 9/00*     (2006.01)
   *B64C 13/34*    (2006.01)
   *B64C 13/28*    (2006.01)
   *H02K 7/06*     (2006.01)
   (Continued)

(52) U.S. Cl.
   CPC ............... *B64C 13/34* (2013.01); *B64C 5/02* (2013.01); *B64C 5/10* (2013.01); *B64C 13/28* (2013.01);
   (Continued)

(58) Field of Classification Search
   CPC .. B64C 13/34; B64C 5/02; B64C 5/10; B64C 13/28; B64C 13/50; F16H 25/205; F16H 25/2454; H02K 7/06
   See application file for complete search history.

(56) References Cited

U.S. PATENT DOCUMENTS 3,501,114 A * 3/1970 Deplante .................. B64C 3/40
                                                       244/226
4,628,752 A * 12/1986 Paxton .................... B64C 13/14
                                                        188/31
(Continued)

FOREIGN PATENT DOCUMENTS

FR         1520646        4/1968
JP      2005299726    *   4/2004 ............. F16H 25/24
(Continued)

OTHER PUBLICATIONS

JP2005299726 English Translation.*
French Search Report and Written Opinion, dated Jun. 22, 2015, French Application No. 1460410.

*Primary Examiner* — Assres H Woldemaryam
(74) *Attorney, Agent, or Firm* — Blakely Sokoloff Taylor & Zafman LLP

(57) ABSTRACT

An actuating device to displace a part of an empennage of a helicopter, including a first part including a first casing fixed to a frame of the helicopter, a first element mounted in rotation with respect to the first casing and a first motor the first element. A second part includes a second casing connected to the part of the empennage, a second element mounted in rotation with respect to the second casing and a second motor driving the second element. A connecting element connects the first part with the second part, being mobile in translation with respect to the first element. Rotation of the first element causes a translation of the connecting element, and is mobile in translation with respect to the second element. Rotation of the second element causes a translation of the connecting element with respect to the second element.

15 Claims, 2 Drawing Sheets

(51) Int. Cl.
*B64C 5/02* (2006.01)
*B64C 5/10* (2006.01)
*B64C 13/50* (2006.01)
*F16H 25/24* (2006.01)
*F16H 25/20* (2006.01)

(52) U.S. Cl.
CPC ........... *B64C 13/50* (2013.01); *F16H 25/205* (2013.01); *F16H 25/2454* (2013.01); *H02K 7/06* (2013.01); *F16H 2025/204* (2013.01); *F16H 2025/2071* (2013.01); *F16H 2025/2081* (2013.01); *F16H 2025/2087* (2013.01)

(56) References Cited

U.S. PATENT DOCUMENTS

| | | | | |
|---|---|---|---|---|
| 4,990,122 A | * | 2/1991 | Grimm | ................... B64C 13/34 244/99.9 |
| 2003/0126981 A1 | * | 7/2003 | Bridger | ................... B64C 13/40 91/459 |
| 2004/0007923 A1 | * | 1/2004 | Tesar | ..................... F16H 25/205 310/12.24 |
| 2006/0144996 A1 | * | 7/2006 | Carl | .......................... B64C 5/10 244/99.2 |
| 2007/0144846 A1 | * | 6/2007 | Bucheton | .............. F16H 25/205 188/297 |
| 2009/0090203 A1 | * | 4/2009 | Jones | ....................... B64C 13/28 74/89.39 |
| 2009/0289145 A1 | * | 11/2009 | Behar | ..................... B64C 13/34 244/99.4 |

FOREIGN PATENT DOCUMENTS

| | | | | |
|---|---|---|---|---|
| JP | 2005299726 | | 10/2005 | |
| WO | WO-2008112363 | | 9/2008 | |
| WO | WO2011096913 | * | 8/2011 | .............. B64C 13/42 |
| WO | WO-2011096913 | | 8/2011 | |

* cited by examiner

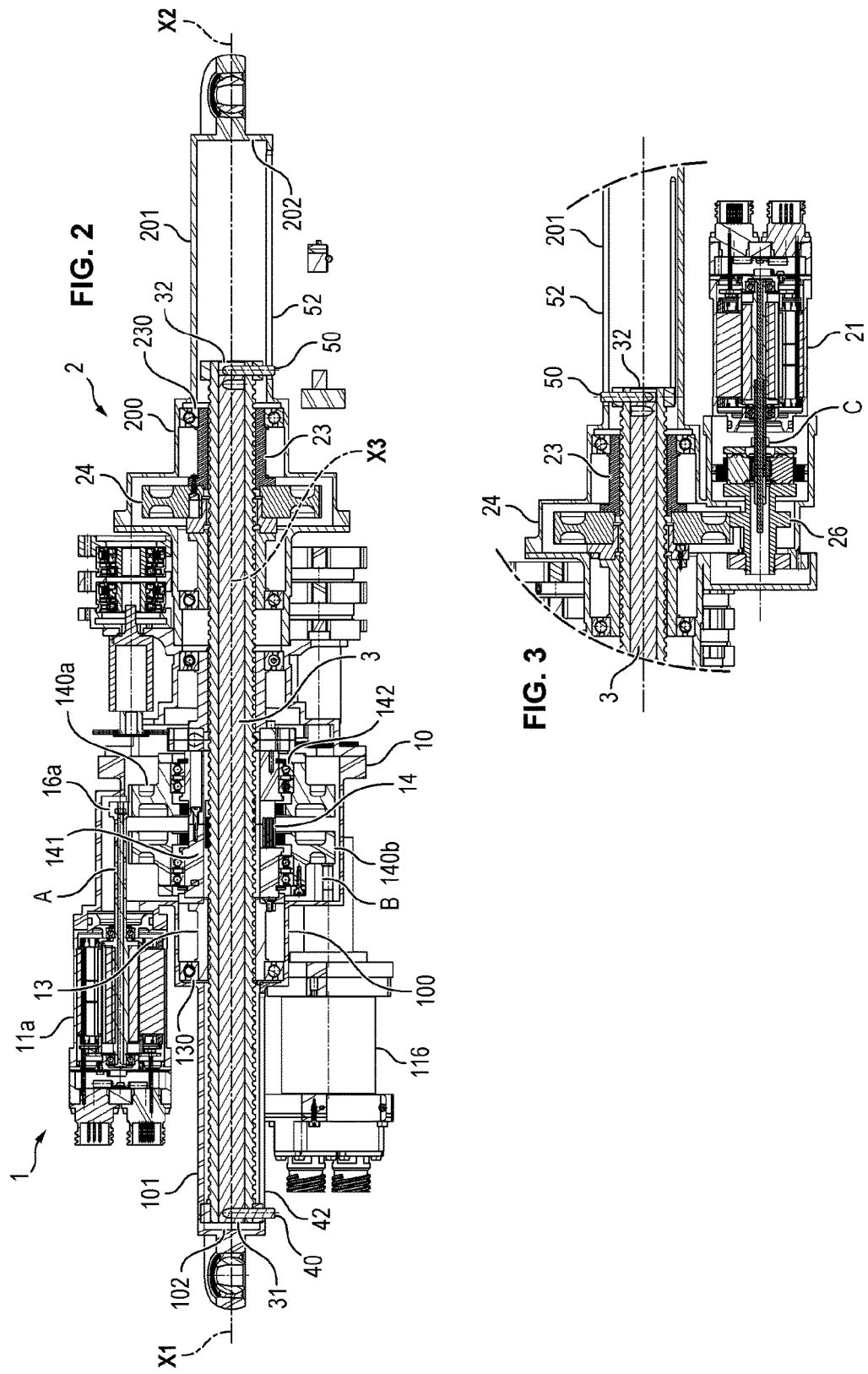

ACTUATING DEVICE FOR DISPLACING A PART OF THE EMPENNAGE OF A HELICOPTER

GENERAL FIELD

The invention relates to the field of flight control actuators.

The invention relates more particularly to an actuating device provided for displacing a part of the empennage of a helicopter.

PRIOR ART

A helicopter includes a tail and an empennage located at the end of the tail. In particular, the empennage of a helicopter includes a horizontal plane, generally fixed, designed to stabilize the helicopter.

It has been proposed to make this horizontal plane movable, particularly with the purpose of facilitating the takeoff phase of the helicopter. The displacement of this movable horizontal plane is then controlled by a motorized actuator.

This actuator positions the horizontal plane in a "low" position during takeoff, this low position making it possible to reduce the minimum power required for lifting the helicopter.

This actuator positions the horizontal plane in a "high" position once the helicopter is in flight, that is once the takeoff phase is completed.

However, blockage of the actuator in the low position occurring when the helicopter is in flight makes its piloting difficult, or even impossible, having the catastrophic consequence of total loss of control of it. Such a blockage is typically caused by a seizure in a mechanical chain of the actuator, or by a breakdown of its motor, or a combination of failures.

The actuator of the horizontal plane is therefore a critical actuator in the flight safety sense.

PRESENTATION OF THE INVENTION

The invention therefore aims to propose an actuating device for displacing a part of the empennage of a helicopter with reduced risk of blockage.

To this end, an actuating device is proposed for displacing a part of the empennage of a helicopter, the device including:
- a first part including a first casing designed to be fixed to a frame of the helicopter, a first element mounted mobile in rotation with respect to the first casing and a first motor capable of driving in rotation the first element,
- a second part, movable with respect to the first part, including a second casing designed to be connected to the empennage part, a second element mounted mobile in rotation with respect to the second casing and a second motor capable of driving in rotation the second element,
- a connecting element to connect the first part with the second part, the connecting element:
  - being mobile in translation with respect to the first element, the connecting element forming with the first element a screw and a nut, so that a rotation of the first element with respect to the connecting element causes a translation of the connecting element with respect to the first element,
  - being mobile in translation with respect to the second element, the connecting element forming with the second element a screw and a nut, so that a rotation of the second element with respect to the connecting element causes a translation of the connecting element with respect to the second element.

Starting one or the other of the two motors allows a displacement of a horizontal plane mechanically connected to the second casing with respect to the frame of a helicopter fixed to the first casing.

Thus, if the connecting element is blocked in translation with respect to one of the two casings (for example, at the first casing due to a breakdown of the first motor or a seizure of the first element), the connecting element can still be displaced in translation by the second motor in combination with the second element, and vice versa.

The actuating device can also be supplemented by the following features, taken alone or in any one of their technically feasible combinations.

The actuating device can include first means for rotatably blocking the connecting element with respect to the first casing and second means for rotatably blocking the connecting element with respect to the second casing.

The presence of the first blocking means allows the transmission of the translational movement of the connecting element to the first casing when the first motor is started. Likewise, the presence of the second blocking means makes it possible to improve the transmission of translational movement of the connecting element to the first casing when the second motor is started.

Moreover, the two blocking means together make it possible to avoid a rotation of the second casing with respect to the first casing.

Moreover, a horizontal plane of a helicopter should not undergo rolling. The interlinked presence of the first and second blocking means allows such a horizontal plane fixed to the second casing to be displaced with respect to the frame of the helicopter fixed to the second casing, without this horizontal plane rolling with respect to the frame of the helicopter.

One and/or the other of the blocking means can include a groove and a pin movable within the groove.

This pin can be integral with the connecting element, and the groove made in one of the casings.

The first element and the second element can be two nuts, and the connecting element consist of a screw coupled to each nut.

One of the parts, so-called main part, can include two motors, each motor being capable of driving in rotation the element mounted mobile in rotation of the main part.

Thus, if one of these motors of the main part suffers a failure, the other motor can be activated.

The other part, so-called auxiliary part, can include a single motor capable of driving in rotation the element mobile in rotation of the auxiliary part.

The main part can be the first part. The auxiliary part can be the second part designed to be fixed to the mobile part of the empennage.

The main part can include a differential including two input shafts, each input shaft being capable of being driven by one of the two motors, and an output shaft capable of driving in rotation the element mobile in rotation of the main part.

Such a differential allows simultaneous activation of these two motors to displace the connecting element, at identical or different speeds.

The main part can include a dog-clutch system including two input gears, each input gear being capable of being driven by one of the two motors, and an output gear capable of driving in rotation the element mobile in rotation of the main part, the dog-clutch system being designed to selectively couple the output gear with one of the two input gears.

The dog-clutch system makes it possible to mechanically isolate the two motors one from the other, and thus to avoid an abnormal operation situation of the motors wherein the motors simultaneously drive rotations of the output shaft.

The actuating device can further include a control unit configured to alternately activate the two motors of the main part.

This alternate activation makes it possible to overcome hidden breakdowns.

The device can further include at least one sensor for the position of the element mounted mobile in rotation of the main part.

The control unit can be configured to selectively activate the motor of the auxiliary part, when the sensor detects immobility of the element mounted mobile in rotation when one and/or the other of the motors of the main part is activated.

Such an event signifies the presence of abnormal operation of the mechanical transmission chain between a motor of the main part and the connecting element. The control unit and the sensor make it possible to detect such abnormal operation automatically and to ensure that the device can still be usable by driving the motor of the auxiliary part in the presence of this abnormal operation of the main part.

Each part can include a brake capable of blocking the motor of the part, and the control unit can be configured to activate the brake when the motor is not activated.

When the motor of one part is not activated, for example the auxiliary part, it is still possible that the translational displacement of the connecting element caused by the main part is transmitted to the element mobile in rotation of the auxiliary part. The activation of the brake of the auxiliary part in this case makes it possible to avoid such a transmission of movement and thus to make the connecting element integral with the auxiliary part, the motor whereof is not driven.

Also proposed within the scope of the present invention is a helicopter including a frame, a horizontal plane and an actuating device conforming to the foregoing description, the device being arranged to displace the horizontal plane with respect to the frame.

DESCRIPTION OF THE FIGURES

Other features, goals and advantages of the invention will be revealed by the description hereafter, which is purely illustrative and not limiting, and which must be read with reference to the appended drawings wherein:

FIG. 2 is a first sectional view of an actuating device according to a second embodiment of the invention.

FIG. 3 is a second view in partial section of the actuating device of FIG. 2. In all the figures, similar elements have identical references.

DETAILED DESCRIPTION OF THE INVENTION

Figure 1:
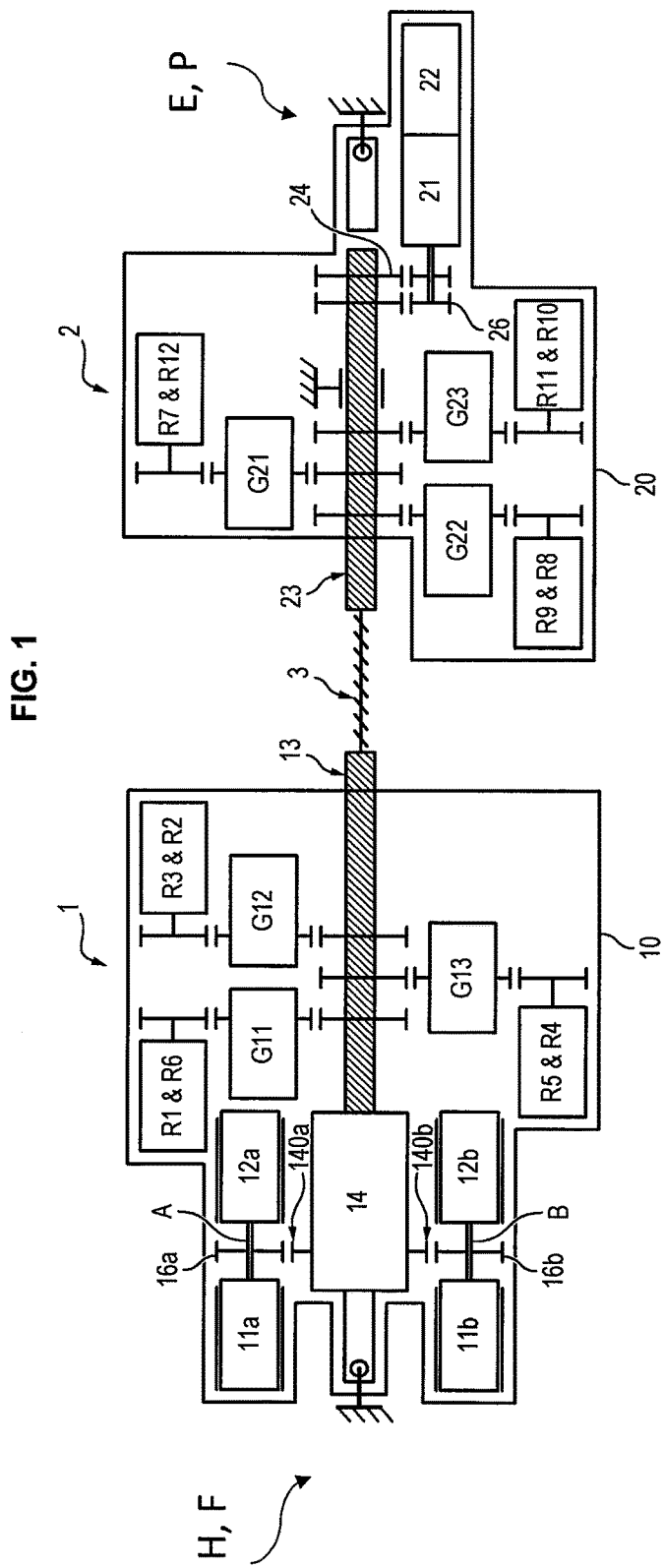
FIG. 1 shows schematically an actuating device according to a first embodiment of the invention.

With reference to FIG. 1, a helicopter H includes a frame F, the frame F including a tail ending with an empennage E.

The empennage E includes a portion that is movable with respect to the frame F of the helicopter H, this mobile part having in particular a horizontal plane P.

The helicopter H also includes an actuation device for displacing the horizontal plane of the helicopter H.

The actuation device includes a first part 1, a second part 2, and a connecting element 3 for connecting the first part 1 with the second part 2.

The second part 2 is movable with respect to the first part 1.

The first part 1 includes a casing 10 capable of being fixed to the frame of the helicopter, an element 13 mounted mobile in rotation with respect to the casing 10, and two motors 11a, 11b, each motor being designed to drive the element 13 in rotation.

The motor 11a is fixedly mounted with respect to the casing 10 in the first part 1.

The motor 11b is also fixedly mounted with respect to the casing 10 in the first part 1.

More precisely, the motor 11a is capable of driving in rotation the element 13 through a mechanical transmission chain including a primary shaft A and equipment 14, which can be a differential or a dog-clutch system.

The equipment 14 includes two input gears 140a, 140b and an output gear 141. The output gear 141 is integral with the element that is mobile in rotation 13.

If the equipment 14 is a dog-clutch system, it is designed for selectively coupling the output gear 141 with one of the two input gears 140a or 140b.

If the equipment 14 is a differential, it is designed to set in rotation the element 13 by distributing rotational movement of the input gears 140a, 140b.

The primary shaft A is mounted in rotation on motor 12a and includes a gear 16a which meshes with the gear 140a.

The first part 1 further includes a brake 12a designed to block the motor 11a. For example, the brake 12a is positioned facing this motor, the primary shaft being mounted in rotation on the brake 12a.

Similarly, the motor 11b is capable of driving in rotation the element 13 through a mechanical transmission chain including another primary shaft B and the aforementioned equipment 14.

The primary shaft B is mounted in rotation on the motor 11b and includes a gear 16b which meshes with the gear 140b.

The first part 1 further includes a brake 12b designed to block motor 11b. For example, the brake 12b is positioned facing this motor 11b, the primary shaft being mounted in rotation on the brake 12b.

Moreover, the second part 2 of the actuating device includes a casing 20 capable of being fixed to the mobile part of the empennage, an element 23 mounted mobile in rotation with respect to the casing 20, and a motor 21 designed to drive the element in rotation 23.

The motor 21 is fixedly mounted with respect to the casing 20 in the second part 2.

More precisely, the motor 21 is capable of driving in rotation the element 23 through a mechanical transmission chain including a primary shaft C. The primary shaft C is mounted in rotation on the second motor 21 and includes a gear 26.

The element mobile in rotation 23 is integral with a gear 24 which meshes with the gear 26 of the primary shaft C.

The second part 2 further includes a brake 22 designed to block the motor 21.

The connecting element 3 connecting the part 1 to the part 2 forms, with the first element 13, a screw and a nut. The connecting element 3 also forms a screw and a nut with the second element 23.

The element 13 and/or the element 23 can consist of two parts mounted pre-loaded one against the other to ensure that the final axial clearance is zero.

The first part 1 and the second part 2 also include a plurality of speed sensors such as RVDT (rotary variable differential transformer) type sensors. In the embodiment shown in FIG. 1, the first part 1 includes three pairs of sensors R1 and R6, R2 and R3, R4 and R5, and the second part 2 includes three pairs of sensors R7 and R12, R8 and R9, R10 and R11. Each sensor is doubled into a pair for reasons of safety: if one of the sensors of a given pair is faulty, the other sensor can still function.

Each sensor is designed to measure the position of the nut with respect to the casing along the axis of the nut, by means of respective gearing referenced G11, G12, G13, G21, G22 and G23.

The device further includes a control unit (not shown) designed to activate/deactivate each motor 11a, 11b, 21 and activate/deactivate each brake 12a, 12b, 22. The control unit is also designed to control the dog-clutch system 14.

The control unit is connected to the position sensors and configured to process measurements provided by these position sensors. The control unit can be more precisely configured to calculate the absolute value of the difference between a position measured by a sensor of the first part, and a position measured by a sensor of the second part.

The control unit can also be connected to an aircraft flight computer.

In a helicopter, the control unit can typically be located in an air conditioned area in the fuselage commonly called a "dog house", and/or in the tail of the helicopter.

In one embodiment illustrated in FIGS. 2 and 3, the connecting element 3 forms a connecting screw, and the elements 13, 23 are two nuts designed to cooperate with the connecting screw 3.

The connecting screw 3 has two opposite end portions 31, 32 and a intermediate threaded portion 30.

The intermediate threaded portion 30 extends over the entire length of the connecting screw along its longitudinal axis X3.

The end portion 31 has a pin 40 extending radially with respect to the longitudinal axis X3 of the screw 3, the pin extending outward with respect to the threads of the intermediate portion 30. Similarly, the end portion 32 has a pin 50 extending radially with respect to the longitudinal axis and extending outward with respect to the threads of the intermediate portion 30.

The casing 10 of the first part 1 includes a wall defining a recess for a portion of the screw 3, particularly the end portion 31.

This wall extends about a longitudinal axis X1 and includes two portions along axis X1: a first portion so-called wall 100 and an end portion 101, so-called end wall, which extends the wall 100.

The nut 13 and the equipment 14 are positioned in the recess located between the wall 100 and the longitudinal axis X1.

The nut 13 has a generally annular shape centered on the axis X1, and has an interior thread complementary to the thread 30 of the screw 3. The nut 13 has a length along the longitudinal axis which is less than the length of the intermediate threaded portion 30 of the screw 3.

The first portion also includes ball bearings 130 between the wall 101 and the nut 13. The nut 13 is mobile in rotation about the longitudinal axis X1 with respect to the wall 100, and thus more generally with respect to the casing 10 of part 1.

In the embodiment illustrated in FIG. 2, the equipment positioned in part 1 is a dog-clutch system.

The dog-clutch system 14 includes two input gears 140a and 140b with annular shapes extending about the longitudinal axis X1 and mobile in rotation with respect to the axis X1. The gear 140a meshes with the gear 16a of the primary shaft A, and the gear 140b meshes with the gear 16b of the primary shaft B.

The dog-clutch system 14 also includes an annular output gear 141 positioned between the longitudinal axis X1 and the two input gears 140a and 140b, also mobile in rotation with respect to the axis X1. The output gear 141 is also movable in translation along the axis X1, between a first position wherein it is selectively linked with the input gear 140a and a second position wherein it is selectively linked with the input gear 140b. The annular shaped output gear 141 has an internal diameter at least equal to the outer diameter of the thread 30 of the screw 3, so that the intermediate portion 30 of the screw 3 can pass through the output gear 141.

The dog-clutch system 14 also includes ball bearings 142 positioned between the radially inner surface of each input gear and the radially outer surface of the output gear 141.

The output gear 141 is further designed to drive in rotation the nut 13. The gear 141 and the nut 13 are linked by engagement.

The end wall 101 extends the wall 100 until a bottom 102 extending transversely to the longitudinal axis.

The end wall 101 defines a recess designed to accommodate the end portion 31 of the connecting screw 3.

A groove (or an opening) 42 is provided in the end wall 101 extending parallel to the longitudinal axis X1.

The groove 42 has dimensions suited for accommodating the pin 40 extending radially outward from the end portion 31 of screw 3. The groove 42 further has a length along the longitudinal axis X1 greater than the maximum displacement of the screw in the casing 10, so as to allow sliding of the pin 40 parallel to the longitudinal axis X1.

Moreover, the casing 20 of the second part 2 includes a wall defining a recess for another portion of the screw 3, in particular the end portion 32.

This wall extends about a longitudinal axis X2 and includes two portions along the axis X2: a first portion so-called wall 200 and an end portion 201, so-called end wall, which extends the wall 200.

The nut 23 is positioned in the recess located between the wall 200 and the longitudinal axis X2.

The nut 23 has a generally annular shape centered on the axis X2 and has an inner thread complementing the thread 30 of the screw 3. The nut 23 has a length along the longitudinal axis which is less than the length of the threaded intermediate portion 30 of the screw 3.

The second part also includes ball bearings 230 between the wall 201 and the nut 23. The nut 23 is mobile in rotation about the longitudinal axis X2 with respect to the wall 200, and thus more generally with respect to the casing 20 of part 1.

The nut 23 is integral with the gear 24 which has an annular shape, about the axis X2. The gear 24 meshes with the gear 26 mounted on the primary shaft C (not visible in FIG. 2, but visible in FIG. 3).

The end wall 201 extends the wall 200 up to a bottom 102 extending transversely to the longitudinal axis.

The end wall 201 defines a recess designed to accommodate the end portion 32 of the connecting screw 3.

A groove (or an opening) 52 is made in the end wall 201 extending parallel to the longitudinal axis X2. The groove 52 has dimensions suited to accommodate the pin 50 extending radially outward from the end portion 32 of the screw 3. The groove 52 further has a length along the longitudinal axis X2 greater than the maximum displacement of the screw in the casing 20, so as to allow sliding of the pin 50 parallel to the longitudinal axis X2.

During assembly of the actuating device, the intermediate portion 30 of the screw 3 is screwed through each of the two nuts 13 and 23 so as to have its threading and the complementary threads of these nuts 13 and 23 cooperate together. The end portion 31 of the screw 3 is inserted into the recess defined by the end wall 101 of the first casing 10 so as to be facing the bottom 101, and the pin 40 inserted into the groove 42. The other end portion 32 of the screw 3 is inserted into the recess defined by the end wall 201 of the second casing 20 so as to face the bottom 201, and the pin 50 of this end portion 32 inserted into the groove 52.

The longitudinal axes X1, X2 and X3 are then coaxial. The screw 3 is then mobile in rotation with respect to the two nuts 13 and 23.

The groove 42 and the pin 40 positioned in the groove 42 together constitute first means for rotatably blocking the screw 3 about the longitudinal axis X1 with respect to the wall 100. Moreover, the groove 52 and the pin 50 positioned in the groove together constitute second means for rotatably blocking the screw 3 about the longitudinal axis X2 with respect to the wall 200.

The two end walls 101 and 201 can have identical lengths. In any case, the screw 3 has a length greater than the sum of the lengths of the two recesses.

More precisely, grooves 42 and 52 made in the casings 10 and 20 are respectively of limited lengths, so as to limit the travel of the pins, and consequently the translational displacement of the screw 3 with respect to the casings 1 and 2. These grooves 42 and 52 can have equal lengths.

FIG. 2 illustrates a configuration of the device wherein the end portion 31 occupies its closest position to the bottom of the recess along axis X1. The screw 3 is therefore in a position fully retracted into part 2. In this same configuration, the end portion 32 is nearest the access opening to the recess defined by wall 201 of part 3; the end portion 32 is therefore in a more remote position from the bottom along axis X2. The screw 3 has a suitable length so that the two casings 10 and 20 are in contact with one another in the illustrated configuration.

Preferably, the screw is of sufficient length to be displaceable in translation over a travel of a length substantially equal to the length of each end wall 101, 201.

Different operating modes of the actuating device will now be described.

Translation Control by Means of the First Motors

In a first step in a first operating mode of the actuator, the control unit deactivates the motor 21 and activates the brake 22. The second nut 23 then finds itself blocked in rotation with respect to the casing 20. Moreover, the blocking means consisting of the pin 50 and the groove 52 block in rotation the connecting screw 3 with respect to the nut 23. Consequently, the screw 3 is fixed with respect to the second casing 20 while the brake 22 is active.

In a second step, the control unit displaces the output gear 141 of the dog-clutch system 14 along axis X1 for selectively engaging with the input gear 140a.

In a third step, the control unit selectively activates the motor 11a and selectively deactivates the corresponding brake 12a.

The motor 11a then drives the primary shaft A in rotation. The gear 16a fixedly mounted on this primary shaft A meshes with the input gear 140a of the dog-clutch system 14 engaged with the output gear 141. The output gear 141 thus drives in rotation the nut 13 about the longitudinal axis X1 with respect to the casing 10.

The rotation of the nut 13 about the axis X1 drives the screw 3 in longitudinal translation in the recess defined by walls 100 and 101. During this translational movement, the pin 40 of the screw 3 slides longitudinally along the groove 42, thus blocking the rotation of the screw 3 with respect to the first casing 10.

The screw 3 is thus displaced in translation with respect to the first casing 10. Depending on the direction of rotation of the motor 11a, the end portion of the screw 31 approaches the bottom 102 or moves away from it.

Moreover, the screw 3 being fixed with respect to the second casing 20 due to the activation of the brake 22, the second casing 20 follows the screw 3 in its translational movement.

The first operating mode thus makes it possible to displace both casings 10 and 20 in translation, one with respect to the other (this without rotation) by means of the screw 3, and therefore to displace the empennage part with respect to the frame of the helicopter.

In a fourth step, the control unit displaces the output gear 141 of the dog-clutch system 14 along the axis X1 to selectively link it with the input gear 140b.

In a fifth step, the control unit deactivates the motor 11a, activates the corresponding brake 12a, activates the other motor 11b and deactivates the corresponding brake 12b.

The motor 11a then drives in rotation the primary shaft B. The gear 16a fixedly mounted on this primary shaft B meshes with the input gear 140b of the dog-clutch system 14 linked with the output gear 141. The output gear 141 thus drives in rotation the nut 13 about the longitudinal axis X1 with respect to the casing 10.

The control unit can also use the motors 11a and 11b of the first part 1 alternately to set in rotation the nut 13, by displacing the output gear 141 of the dog-clutch system 14. This makes it possible in particular to overcome hidden breakdowns. Indeed, if the control unit only activates one of the two motors at each displacement, the second motor would never be used and it would never be known whether it was functional or not. The risk, therefore, is that it is suffering a hidden breakdown when its activation is required.

Translation Control by Means of the Second Motor

In a first step of a second operating mode of the actuator, the control unit deactivates motors 11a, 11 b of the first part 1 and activates the corresponding brakes 12a, 12b. The first nut 13 is then blocked in rotation. Moreover, the blocking means 4 consisting of the pin 40 and the groove 42 block in rotation the screw 3 with respect to the nut 13. Consequently the screw 3 is fixed with respect to the first part 1 when the two brakes 12a, 12b are active.

In a second step, the control unit then activates selectively the motor 21 of the second part 2 and deactivates the corresponding brake 22.

The motor 21 then drives in rotation the primary shaft C. The gear 26 mounted on this primary shaft C meshes with the gear 24 which thus in its turn drives in rotation the nut 23 with respect to the casing 20.

The rotation of the nut 23 drives the screw 3 in longitudinal translation in the recess defined by the walls 200 and 201. During this translational movement, the pin 50 of the screw 3 slides longitudinally along the groove 52, but blocks all rotation of the screw 3 with respect to the second casing 20.

The screw 3 is thus displaced in translation with respect to the second casing 20. Depending on the direction of rotation of the motor 21, the end portion of the screw approaches the bottom or moves away from it.

Moreover, the screw 3 being fixed with respect to the first casing 10 due to the activation of brakes 12a, 12b, the first casing 10 follows the screw 3 in its translational movement.

The second operating mode therefore makes it possible to move the empennage part in translation with respect to the frame of the helicopter, independently of the first operating mode previously described.

Toggling Between the First Operating Mode and the Second Operating Mode.

As seen previously, the control unit has two operating modes for controlling the displacement of the two casings 10, 20 in translation one with respect to the other: by activating at least one of the motors 11a, 11b of the first part 1, or by activating the motor 21 of the second part 2.

The first operating mode is used by the control unit in a normal operating condition of the actuating device.

Detection by a sensor of the first part 1 of immobility of the nut, when one or the other of the motors is active, signifies the presence of a failure in the mechanical transmission chain used in the first part 1 and/or a breakdown of the motor used by the control unit.

During such an event, the control unit switches the motors and the brakes of the device so as to toggle into the second operating mode by implementing the fourth and fifth steps previously described.

In a similar manner, the control unit can switch the motors and the brakes of the device to toggle from the second operating mode into the first operation mode in the case where sensors of the second part 2 detect immobility of the nut while the motor 22 is active.

The invention is not limited to the embodiments previously described.

In one variant embodiment, not shown, the connecting element 3 is a nut and the two elements 13, 23 are screws driven in rotation by motors 11a, 11b, 21.

The dog-clutch system can be replaced by a differential including two input gears, each input gear being capable of being driven by one of the two motors, and an output gear capable of driving in rotation the movable element 13.

This differential allows simultaneous activation of the two motors 11a, 11b of the first part 1. In this case, the two brakes are deactivated simultaneously.

This differential further has no need to be controlled by the control unit during the implementation of the method described previously.

The invention claimed is:

1. A helicopter actuating device for displacing a part of an empennage of a helicopter, the device including:
   a first part including a first casing designed to be fixed to a frame of the helicopter, a first element mounted mobile in rotation with respect to the first casing and a first motor capable of driving the first element in rotation,
   a second part, movable with respect to the first part, including a second casing designed to be connected to the part of the empennage, a second element mounted mobile in rotation with respect to the second casing and a second motor capable of driving the second element in rotation,
   a connecting element to connect the first part with the second part, the connecting element:
   being mobile in translation with respect to the first element, the connecting element forming with the first element a screw and a nut, so that rotation of the first element with respect to the connecting element causes a translation of the connecting element with respect to the first element, and
   being mobile in translation with respect to the second element, the connecting element forming with the second element a screw and a nut, so that a rotation of the second element with respect to the connecting element causes a translation of the connecting element with respect to the second element.

2. The device according to claim 1, including first means for rotatably blocking the connecting element with respect to the first casing and second means for rotatably blocking the connecting element with respect to the second casing.

3. The device according to claim 2, wherein one of the blocking means includes a groove and a pin mobile in the groove.

4. The device according to claim 3, wherein the pin is integral with the connecting element and the groove is made in one of the casings.

5. The device according to claim 1, wherein the first element and the second element are two nuts, and the connecting element forms a screw coupled with each nut.

6. The device according to claim 1, wherein one of the first and second parts is a main part, including two motors, each motor being capable of driving in rotation the first or second element mobile in rotation of the main part.

7. The device according to claim 6, wherein one of the first and second parts is an auxiliary part, including only one motor capable of driving in rotation the first or second element mobile in rotation of the auxiliary part.

8. The device according to claim 6, wherein the main part includes a dog-clutch system including two input gears, each input gear being capable of being driven by one of the two motors, and an output gear capable of driving in rotation the first or second element mobile in rotation of the main part, the dog-clutch system being designed to selectively couple the output gear with one of the two input gears.

9. The device according to claim 6, wherein the main part includes a differential including two input gears, each input gear being capable of being driven by one of the two motors, and an output gear capable of driving in rotation the element mobile in rotation of the main part.

10. The device according to claim 6, wherein the main part is the first part.

11. The device according to claim 6, further including a control unit configured to activate alternatively the two motors of the main part.

12. The device according to claim 6, further including at least one sensor (R1-R6) for the position of the first element movably mounted with respect to the first casing, and/or at least one sensor (R7-R12) for the position of the second element movably mounted with respect to the second casing.

13. The device according to claim 11, wherein one of the first and second parts is an auxiliary part, including only one motor capable of driving in rotation the first or second element mobile in rotation of the auxiliary part, and wherein the control unit is further configured to selectively activate the motor of the auxiliary part, when a sensor (R1-R6) detects immobility of the first or second element mobile in rotation of the auxiliary part while at least one of the motors of the main part is activated.

14. The device according to claim 11, wherein the first part includes a first brake capable of blocking the first motor and the second part includes a second brake capable of blocking the second motor and the control unit is configured to activate the first brake when the first motor is not activated and to activate the second brake when the second motor is not activated.

15. A helicopter including a frame, a horizontal plane and a device according to claim 1 positioned to displace the horizontal plane with respect to the frame.

* * * * *